Patented Apr. 13, 1948

2,439,689

UNITED STATES PATENT OFFICE 2,439,689

METHOD OF RENDERING GLASS WATER REPELLENT

James Franklin Hyde, Corning, N. Y., assignor to Corning Glass Works, Corning, N. Y., a corporation of New York No Drawing. Application June 11, 1943, Serial No. 490,517

2 Claims. (Cl. 117—124)

This invention relates to the treatment of base members comprising solid or fibrous bodies for the purpose of rendering them water-repellent and to the products thereof.

This application is in part a continuation of my copending application S. N. 318,373, filed February 10, 1940, now Patent No. 2,386,466, and assigned to the assignee of the present application.

Although applicable to practically any material, organic or inorganic, my invention is particularly applicable to base members of a siliceous character such as glass and glazed or enameled articles, porcelain, asbestos, quartz, mica and the like. As is well known, the surfaces of such materials are hydrophilic and normally possess a strongly adsorbed surface film or moisture. This is sometimes objectionable and it is often desirable to render such surfaces water-repellent. For example, it is customary to treat glass fibres with oils, waxes, etc., during manufacture in order to protect the glass surface from the effect of moisture and to prevent loss of tensile strength by abrasion. The prior materials are effective under limited conditions, but can be displaced by water which has a greater affinity for glass than the materials themselves. Consequently, the wet tensile strength of the fibres is relatively small compared to their strength when dry. Accordingly, it would be desirable to provide a material which renders the glass water-repellent in order to avoid a decrease in tensile strength of the glass fibres when they are exposed to moisture. Another illustration of the deleterious effects of moisture is found in glass bodies for electrical insulating purposes which, when exposed to the weather, lose their high electrical surface resistance under wet conditions. This is particularly true in the case of glass fibres where there is an extremely large surface per unit volume. A material which would help to preserve the high electrical surface resistance is highly desirable. Many other illustrations of the harmful effects of moisture exist but are too well known to require further discussion here.

The primary object of this invention is to render normally non-water-repellent base members water-repellent.

Another object is to provide an improved method for rendering normally non-water-repellent surfaces water-repellent.

Another object is to make siliceous bodies and materials non-wetting.

Another object is to maintain the high electrical surface resistance of glass bodies under wet conditions.

Another object is to prevent abrasion, increase wet flex strength and maintain the electrical surface resistance of glass fibres and fibrous glass textiles.

According to my invention I have found that the above and other objects are attained when the base member is treated with one or more organo-silicon compounds selected from the class consisting of hydrolyzable organo-silicanes, their hydrolysis products or their polymerized hydrolysis products.

By hydrolyzable organo-silicanes I mean derivatives of $SiH_4$ which contain readily hydrolyzable radicals such as halogens, amino groups, alkoxy, aroxy, and acyloxy radicals, etc., the remaining valences of the silicon atoms being satisfied by organic radicals that are joined to the silicon atoms through carbon atoms. Examples of such organic radicals are as follows: aliphatic radicals, such as methyl, ethyl, propyl, isopropyl, butyl, amyl, hexyl, heptyl to octadecyl and higher; alicyclic radicals such as cyclopentyl, cyclohexyl, etc.; aryl and alkaryl radicals such as phenyl, mono- and poly-alkyl phenyls as tolyl, xylyl, mesityl, mono-, di- and tri-ethyl phenyls, mono-, di- and tri-propyl phenyls, etc.; nephthyl, mono- and poly-alkyl naphthyls as methyl naphthyl, diethyl naphthyl, tri-propyl naphthyl, etc.; tetrahydronaphthyl, anthracyl, etc.; aralkyl such as benzyl, phenylethyl, etc.; alkenyl such as methallyl, allyl, etc.; and heterocyclic radicals. The above organic radicals may also, if desired, contain inorganic substituents such as halogens, etc.

Hydrolysis of the above described silicanes produces the corresponding hydroxy silicanes (sometimes called silicols) which in certain instances may be isolated. However, in most cases, the hydroxy silicanes condense, particularly if heat is applied, to form polymers which contain one or more Si-O-Si groups. These polymers may in turn be further polymerized to higher polymers by suitable treatment such as by acid, alkali or air as disclosed in my co-pending applications S. N. 481,155 filed March 30, 1943, S. N. 481,154 filed March 30, 1943, now abandoned, and S. N. 451,354 filed July 17, 1942, now abandoned. If desired, the hydrolysis product and higher polymers of a mixture of organo-silicanes may be employed in accordance with my invention. The hydrolysis product of such a mixture is generally a co-polymer which may contain various amounts of differently substituted organo-silicon units as disclosed in my co-pending application S. N. 432,528 filed February 26, 1942. All of these compounds and mixtures, namely, the organo-silicanes, their hydrolysis products and their polymerized hydrolysis products are within the scope of my invention as useful water-proofing agents.

Such organo-silicon compounds may be applied to the base member by dipping it or by spraying it or otherwise contacting it with the liquid compounds or their solution. Alternatively the liquid compounds may be vaporized by blowing air or steam through them and the base member may be coated therewith by contacting it with such vapors. Or, if desired, the liquid compounds may be vaporized by heat or reduced pressure and the vapors allowed to contact the base member. The use of organo silicon halide vapors is described and claimed in an application by Oscar Kenneth Johannson, Serial No. 490,516, filed June 11, 1943, now abandoned. Any excess of the organo-silicon compound, if desired, may be removed by washing and rinsing the treated surface with fresh solvent. After such treatment a film, which probably is not more than a few molecules thick, will remain strongly adsorbed on the treated surface and the latter is rendered water-repellent.

Adherence of the organo-silicon compounds, especially when the latter is a hydrolysis product or polymerized hydrolysis product, is enhanced by adding a trace of a polymerizing catalyst preferably an acid or an alkali to the compound before contacting the base member therewith. When the base member to be treated is glass, it is advantageous to wash the glass with a strong acid such as HCl and rinse and dry it before contacting it with the organo-silicon compound, because the organo-silicon compounds have been found to adhere better to glass surfaces which have first been treated with acid.

I have found that the general effectiveness of the treatment and adherence of the film is increased if the base member is heated after the treatment at a temperature below the boiling point or decomposition temperature of the compound. Heating for a few minutes to an hour is sufficient. For reasons not understood, such heating does not eliminate the invisible film but, on the contrary, seems to improve its stability. At the same time the non-wetting properties of the film seem to be improved. I have also found that optimum results are obtained by using the organo-silicon halides which contain the higher alkyl radicals, preferably those having seven or more carbon atoms such as heptyl, lauryl, octadecyl, etc.

For a better understanding of my invention reference should be had to the following examples which illustrate but do not limit the scope of my invention.

*Example 1*

A beaker was treated by swabbing its interior with a cloth wet by a solution of iso-amylsilicon trichloride in benzene. Thereafter the interior of the beaker was non-wetting and when water was boiled in it, the bottom and walls of the beaker were covered with bubbles of steam which were constantly forming and breaking away. On this account liquids heated in the beaker could not be made to "bump."

*Example 2*

The bore of a glass capillary tube was treated by passing through it a benzene solution of phenylethyl silicone. The tube thus treated was dipped into distilled water along with another tube having a bore of the same size as the first tube but not treated with the silicone. The capillary rise of the water in the first or treated tube was only three-fourths as great as that in the second or untreated tube. This indicated that the bore of the treated tube had become water-repellent and that the silicone had altered the interfacial tension between the water and the glass.

*Example 3*

Diphenyl silicone contained in a flask was vaporized by passing steam through the flask in the manner known as steam distillation. When the effluent vapors were passed into a glass bulb for a short time, the interior surface of the bulb became water-repellent.

Another flask containing phenyl ethyl silicone was substituted for the first flask and the interior of the clean glass bulb was contacted by the vapors with the result that again the surface thus treated became water-repellent.

*Example 4*

The water-proofing qualities of organo-substituted silicon compounds, when applied to glass fibre yarns, were demonstrated by the following tests:

In performing the tests, the yarn was flexed over a freely rotatable steel mandrel one-eighth inch in diameter at a tension of three-fourths of a pound. Breakage of the yarn constituted failure. The tests were performed first by using dry yarn and then by pouring water on the yarn while flexing it over the mandrel. With dry, untreated yarn, from 700 to 1000 flexes could be obtained but, when wet with water, the untreated yarn withstood only 30 to 40 flexes before failure. When the yarn was previously treated with a dilute solution of phenyl ethyl silicone in toluene, from 2000 to 3000 dry flexes and from 650 to 1200 wet flexes were obtained before failure. When the yarn was similarly treated with dimethyl silicone, 1600 to 1700 dry flexes and 600 to 800 wet flexes were obtained.

*Example 5*

A solution of about 8% methyltriethoxysilicane in benzene was applied to a glass plate which had first been cleaned with hydrofluoric acid and rinsed with distilled water and dried. The treated plate was then immersed in a stream of water and when removed appeared to be wet although, on drying, the water ran away from the treated surface first. Another glass plate was similarly treated, but was then heated for fifteen minutes at 220° C. before being treated with water. The treated surface was then markedly water-repellent.

*Example 6*

An 8% solution of dimethyldiethoxysilicane in benzene was applied to one-half of a glass plate and the plate was then heated for ten minutes at 220° C. The treated part of the plate was thereafter hydrophobic, but the untreated part remained hydrophilic.

*Example 7*

Glass fibre tape which had been cleaned and freed from sizing, etc., by washing with ammoniacal acetone and water was dipped into a 2% solution of laurylsilicon trichloride in xylene and allowed to dry in air. The tape was thereafter very water-repellent and could not be wet thereby. It was more soft and satiny and had a better hand than before the sizing was removed.

*Example 8*

Glass fibre tape from which the sizing was removed, as in Example 7, was dipped into a 2.5% solution of dilaurylsilicon dichloride in xylene and allowed to dry in air. The tape thereafter was water-repellent and was soft and lustrous with an improved hand.

*Example 9*

Some 2.5 grain, 2 ply glass fibre yarn had a dry breaking strength of 10.7 lbs. Its wet breaking strength was 3.4 lbs. After the yarn had been treated with a 0.5% solution of diethylsilicon dichloride in benzene, its dry breaking strength was 10.6 lbs. and its wet breaking strength was 8.15 lbs., or more than twice the wet strength of the untreated yarn. The electrical surface resistance of the untreated yarn was five megohms per inch and for the treated yarn was 200 megohms. Fluctuations in resistance from breathing on the test sample were also markedly decreased by the treatment.

*Example 10*

A number of glass rods were carefully fortified by etching their surfaces with hydrofluoric acid to remove surface checks and flaws. Part of the fortified rods were dipped in a 1% solution of octadecylsilicon trichloride in benzene after which they were heated for three minutes at 110° C. All rods were then subjected to abrasion in like degree by an accurately controlled abrading device and the tensile strength of the rods was then determined by the usual transverse loading test. The average tensile strength of the rods which had been treated with octadecylsilicon trichloride was substantially twice as great as that of the untreated rods.

I am unable to account for the unusual water-repellent properties of the base members treated with organo-silicon compounds in accordance with my invention. It is well known that hydrophilic surfaces, such as surfaces of glass and other siliceous materials, normally possess strongly adsorbed films of moisture. It is possible that the hydrolyzable organo-silicanes are hydrolyzed by such surface moisture and form the corresponding silicols or silicones, but why the hydrolysis products or polymerized hydrolysis products per se should be strongly adsorbed by the hydrophyllic surfaces and why these organo-silicon compounds in general render such surfaces water-repellent is not understood.

As hereinbefore pointed out, I have found that my invention is applicable to siliceous materials, such as glass, mica, asbestos, "Alsifilm," etc. My invention is also applicable to non-siliceous materials including textile materials such as cotton, silk, rayon, wool, hemp, flax and the like; organic sheet materials such as paper, wood, Cellophane, regenerated cellulose, cellulose esters and ethers, vinyl polymers, nylon, etc.; plastic materials both natural and synthetic, and filaments and sheets made therefrom, etc.

The water repellent coatings of my invention have varied utility. They are especially useful for the treatment of glass fibres during manufacture to provide protection against leaching by moisture, increased wet flex strength, abrasion resistance and electrical surface resistance. These coatings should, therefore, be useful in the production of electrical insulating materials which are intended to function under humid condition.

As pointed out above, coatings from which any excess of the organo-silicon compound is removed by washing with organic solvents are probably molecular in thickness. However, for certain applications it is desirable not to wash off the excess organo-silicon compound in order to provide the treated article with a layer of the compound which has a depth of more than a few molecules. This layer then serves purposes in addition to that of rendering the article water-repellent. For example, in the manufacture of a continuous glass fibre or filament, the organo-silicon compound is applied to the fibre immediately following its formation and prior to the grouping of a plurality of such fibres into a yarn. The organo-silicon compound not only renders the fibres water-repellent but also increases the mass integrity of the group of fibres, and inhibits mutual abrasion of the fibres and facilitates the handling, winding and unwinding of the yarn upon spools and various other steps of the process.

Other uses for which my invention may be adapted include the production of water-repellent coatings on glass bearings to provide permanent, self-contained lubricating means therefor and coatings on threads of glass, rayon, cotton and the like for use in the fabrication of tires, the organo-silicon compound employed being compatible with rubber, etc.

When the organic constituents of the hydrolyzable organo-silicanes employed comprise alkyl hydrocarbon radicals of the paraffin series, the water-repellent characteristics of the surfaces treated therewith become more pronounced as the size of the radical increases and the treated surfaces become waxy or unctuous to the touch. This is particularly noticeable with the radicals containing more than six carbon atoms such as lauryl, octadecyl, etc.

Some organo-silicon compounds of my invention are somewhat soluble in water, yet their application to surfaces in accordance with my invention renders such surfaces water-repellent. Such is the case with certain organo-substituted silicols, for example, phenyl ethylsilicane diol.

I claim:

1. The method of treating glass which comprises dissolving octadecyl silicon trichloride in a volatile solvent to form a dilute solution thereof, applying the solution to the surface of the glass, removing the glass from contact with the body of the solution and thereafter heating the glass at a temperature of at least 110° C. but below the decomposition point of the octadecyl silicon trichloride, thereby to render the glass water-repellent.

2. The method of treating glass which comprises dissolving an alkyl silicon trichloride, in which the alkyl radical is one which contains 7 or more carbon atoms in a volatile solvent to form a dilute solution thereof, applying the solution to the surface of the glass, removing the glass from contact with the body of the solution, and thereafter heating the glass at a temperature of at least 110° C. but below the decomposition point of the alkyl silicon trichloride, whereby to render the glass water repellent.

JAMES FRANKLIN HYDE.

REFERENCES CITED

The following references are of record in the file of this patent:

UNITED STATES PATENTS

| Number | Name | Date |
| --- | --- | --- |
| 2,030,739 | Bley | Feb. 11, 1936 |
| 2,034,987 | Morita | Mar. 24, 1936 |
| 2,053,474 | Graves | Sept. 8, 1936 |
| 2,204,859 | Hyatt | June 18, 1940 |
| 2,258,218 | Rochow | Oct. 17, 1941 |
| 2,258,219 | Rochow | Oct. 17, 1941 |
| 2,258,220 | Rochow | Oct. 17, 1941 |
| 2,306,222 | Patnode | Dec. 22, 1942 |